E. REYNOLDS.
FRICTION-CLUTCH.
No. 174,303. Patented Feb. 29, 1876.
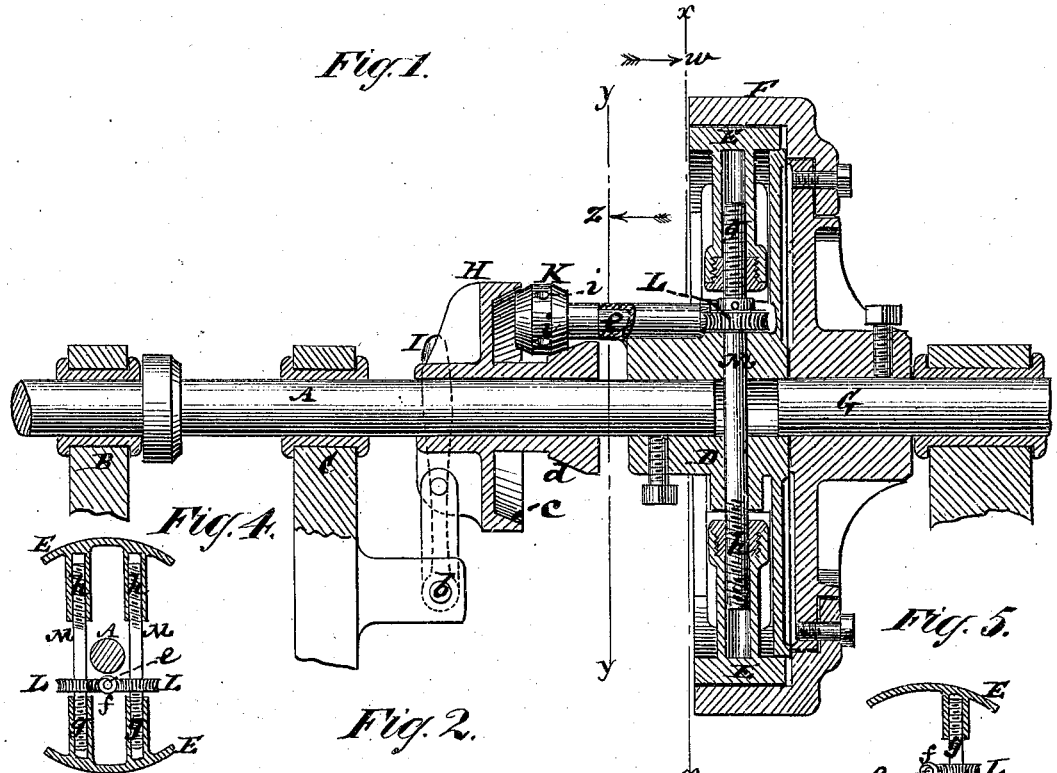
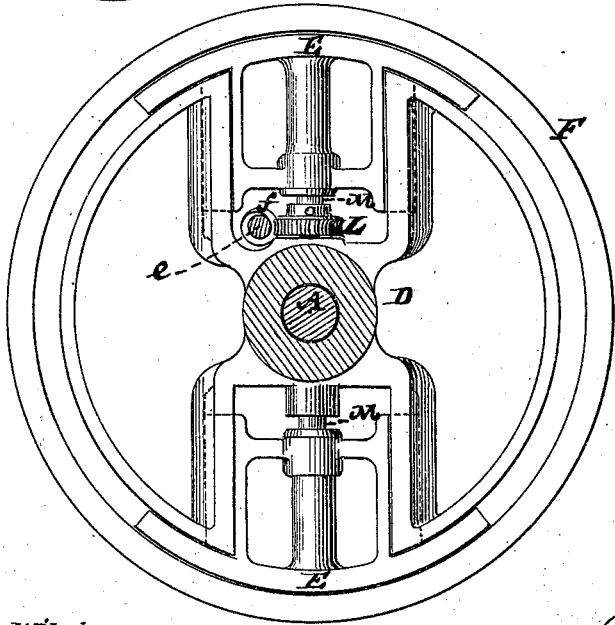
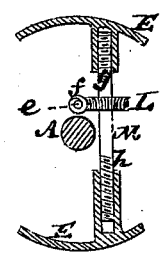
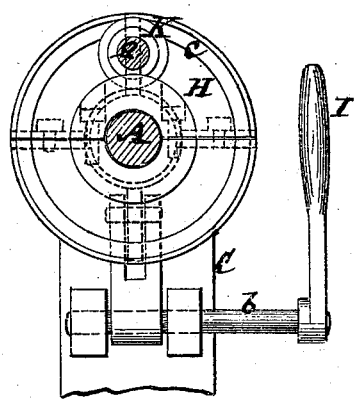
Witnesses:
John Becker
Fred. Haynes
Edwin Reynolds
by his Attorneys
Brown & Allen

UNITED STATES PATENT OFFICE.

EDWIN REYNOLDS, OF PROVIDENCE, RHODE ISLAND.

IMPROVEMENT IN FRICTION-CLUTCHES.

Specification forming part of Letters Patent No. 174,303, dated February 29, 1876; application filed February 3, 1876.

*To all whom it may concern:*

Be it known that I, EDWIN REYNOLDS, of the city and county of Providence, and State of Rhode Island, have invented new and useful Improvements in Friction-Clutches; and I do hereby declare that the following is a full, clear, and exact description of the same, reference being had to the accompanying drawing, which forms part of this specification.

This invention consists in a friction-clutch for revolving shafts or bodies, in which a reversing-sleeve made capable of sliding longitudinally, but restrained from rotating, is combined with a friction wheel or roller made to revolve in and around said sleeve in eccentric relation with the axis of the latter, and whereby, accordingly as said sleeve is shifted longitudinally to press or bear on opposite sides of the friction wheel or roller, the motion of the latter around its own axis is reversed. This friction wheel or roller has combined with it a screw, which is arranged to gear with one or more worm-wheels on a screw or screws fitted to operate one or more friction clamps or shoes, by which rotary motion is communicated to a secondary shaft, or by which the motion of the latter is arrested, accordingly as the connection of the clutch is established or broken by the adjustment of the longitudinally-sliding sleeve. Instead of the worm-wheel and screw or screws, other mechanical devices may be used, in combination with the sliding sleeve and revolving friction wheel or roller, for putting into action and liberating the friction clamps or shoes. A friction-clutch constructed in accordance with this invention is or may be free from any readjustment of parts to compensate for wear, and the power developed by frictional contact is unlimited, or, in other words, "slip" is effectually prevented or controlled.

Figure 1 represents a longitudinal sectional view of a friction-clutch constructed in accordance with my invention. Fig. 2 is a transverse section of the same on the line $x\,x$, looking in direction of the arrow $w$; and Fig. 3, a further transverse section on the line $y\,y$, looking in direction of the arrow $z$. Figs. 4 and 5 are views of certain modifications of some of the details.

Referring, in the first instance, to Figs. 1, 2, and 3 of the drawing, A represents a revolving driving-shaft, arranged to work in suitable bearings B C, and having secured to its inner end a disk or plate, D, which carries, by means of radial slides or otherwise, friction clamps or shoes E, that, accordingly as they are worked in or out, establish or break frictional contact with a pulley, F, on a secondary shaft, G, to rotate or arrest the motion of the latter. H is what I term a "reversing-sleeve," arranged to slide longitudinally in relation with or around the shaft A, but which is restrained from rotating—as, for instance, by connecting it in a jointed manner with a rock-shaft, $b$, which is hung in fixed bearings, and provided with a lever, I, whereby the sleeve H may be forced toward or from the clamp-carrying plate D. This sleeve H is constructed with an outer internally-beveled friction-surface, $c$, and with an inner externally-beveled surface, $d$, both in concentric relation with the shaft A. K is a friction wheel or roller, fast on a shaft, $e$, which is in eccentric relation with the shaft A, and is carried by a projection or bearing on the plate D. This wheel K, the axes of which may be parallel with the axes of the shafts A G, is double-faced, or of reversely conical form on its opposite sides or edges, to conform with the bevels $c\,d$ of the sleeve H, against either one of which surfaces or bevels the wheel K is made to bear on opposite sides of its axis, accordingly as the sleeve H is slid in or out, and whereby a reverse motion on its own axes is communicated to the wheel K, as the latter is rotated in common with the shaft A and plate D. This constitutes the primary motion for connecting and disconnecting the clutch. On the shaft $e$ of the friction-wheel K is a screw, $f$, which gears with a worm-wheel, L, fast on a screw or cross-spindle, M, having a right-hand screw-thread, $g$, on its one end, and a left-hand screw-thread, $h$, on its opposite end. This screw M is carried by the disk or plate D, and its threads $g\,h$ are made to fit screw boxes or nuts connected with the shoes or clamps E, whereby said clamps are worked in or out, to establish or break frictional contact with the pulley F, accordingly as the friction-wheel K is put in working contact with the surfaces $c$ or $d$ by the longitudinal adjustment of the sleeve H. When only one shoe or clamp E is used for driving by friction from but one side of the shaft A, then the screw M may be restricted accordingly to such one side of the shaft, and needs only a single screw-thread on its outer end. Such screw and worm-wheel mechanism, however, admits of various modifications. Thus the screw $f$ on the shaft $e$ of the friction-wheel K may gear with duplicate worm-wheels L, arranged on opposite sides of it, and fast on parallel screws M M, provided with threads on one or both of their ends, to establish driving friction on one or both sides of the main shaft, as illustrated in Fig. 4 of the drawing; or but one screw, M, arranged in lateral relation with the shaft A, and a single worm-wheel, L, may be used, as shown in Fig. 5 of the drawing. These modifications are in effect but equivalents of the parts shown in Figs. 1, 2, and 3 of the drawing. A friction-clutch constructed as described operates, irrespectively of the direction in which the shaft A is rotated, by suitably shifting or sliding longitudinally the sleeve H. It furthermore requires no readjustment of parts, after being once fitted, to compensate for wear of the frictional surfaces, and the amount of power that can be developed by frictional contact is practically unlimited, as fine-pitched screws may be used; or the frictional surfaces of the clamps and pulley or body said clamps bear against may be constructed with V-shaped grooves. In any case the several frictional surfaces may either be smooth or rough, and instead of the shoes or clamps E being arranged on the inside of the pulley F, they may be disposed to operate against the outside of said pulley to drive the shaft G. The clutch may be coupled or uncoupled, when the shaft A is not in motion, by inserting a pin or bar in holes $i$ in the wheel K, and rotating the wheel by hand applied to said bar. This wheel K may be made of any suitable form on its faces, and need not necessarily be conical; but it is preferably so made. Thus, said friction-wheel may be double-faced, or have working friction-surfaces on its opposite sides, which are not conical, and the surfaces of the sleeve H against which the faces or opposite sides of the friction-wheel bear be made to correspond.

I claim—

1. The combination, in a friction-clutch, of the longitudinally-adjustable but non-rotating reversing-sleeve H, having an outer friction-surface, $c$, and inner friction-surface $d$, with the double-faced friction-wheel K, made not only to rotate on its own axis, but also to revolve in eccentric relation with the non-rotating reversing-sleeve H, or around the axis of the latter, and between its outer and inner friction surfaces $cd$, substantially as specified.

2. The combination, with the rotating and revolving double-faced friction-wheel K, and longitudinally-adjustable but non-rotating reversing-sleeve H, having outer and inner friction-surfaces $c$ and $d$, of the screw $f$, one or more worm-wheels, L, one or more screws, M, one or more friction clamps or shoes, E, and the pulley or body F, rotated by the clamps, essentially as herein set forth.

EDWIN REYNOLDS.

Witnesses:
MICHAEL RYAN,
FRED. HAYNES.